United States Patent [19]

Oppitz

[11] Patent Number: 4,616,125

[45] Date of Patent: Oct. 7, 1986

[54] HEATING ELEMENT

[75] Inventor: Hans Oppitz, Mils, Austria

[73] Assignee: ELTAC Nogler & Daum KG, Innsbruck, Austria

[21] Appl. No.: 695,839

[22] Filed: Jan. 28, 1985

[30] Foreign Application Priority Data

Feb. 3, 1984 [AT] Austria .................................... 344/84

[51] Int. Cl.⁴ ............................................. H05B 3/10
[52] U.S. Cl. .................................... 219/553; 219/505;
219/548; 338/22 R; 338/212
[58] Field of Search ............... 219/505, 528, 541, 543,
219/549, 553; 338/22 R, 22 SD, 212;
156/275.1; 174/DIG. 8; 252/511; 29/592 R

[56] References Cited

U.S. PATENT DOCUMENTS

| | | | |
|---|---|---|---|
| 3,397,302 | 8/1968 | Hosford | 219/528 |
| 3,535,494 | 10/1970 | Armbruster | 219/528 |
| 4,177,376 | 10/1979 | Horsma et al. | 219/553 |
| 4,223,209 | 9/1980 | Diaz | 219/549 |
| 4,304,987 | 12/1981 | van Konynenburg | 219/553 |
| 4,517,449 | 5/1985 | Chazan et al. | 219/549 |

Primary Examiner—E. A. Goldberg
Assistant Examiner—M. M. Lateef
Attorney, Agent, or Firm—Kurt Kelman

[57] ABSTRACT

In a heating element comprising an electrical resistance layer disposed between two areal electrodes extending generally parallel to one another, the resistance layer is formed to be thermally insulating and is permeated with electrically conductive plastics material having a positive temperature coefficient of electrical resistance. The conductive plastics may comprise thermoplastics material incorporating a particulate filler of granular, spheroidal or bubble form, and the electrodes may be coated black to serve as black bodies. The element may be disposed within a thermally insulating member acting as a heat shield.

11 Claims, 7 Drawing Figures

HEATING ELEMENT

BACKGROUND OF THE INVENTION

1. Field of the Invention

The invention relates to a heating element comprising a layer forming an electrical resistance which is situated between two planar electrodes extending approximately parallel to each other and to the said layer and, suitably but not exclusively, comprising an insulating layer situated on the side of the electrode facing away from the said layer, in which the flow of current occurs at right angles to a plane which extends approximately parallel to the layer forming the resistance, and to a method of manufacture thereof.

2. Description of the Prior Art

Planar heating elements devised by the present inventor are already known, which comprise an electrical layer resistance between material of satisfactory electrical and thermal conductivity, with the flow of current occurring substantially at right angles to the plane of the layer. The electrical layer resistance is then formed by electrical resistance compositions which, for example, consist of silicone rubber with electrically conductive and semiconductive particles homogenously distributed therein, or of an electrically conductive composite material, in which the synthetic resins are mixed with metal compounds in a quantity such that approximately one metal or metalloid atom is provided per molecule of synthetic resin, from which the ions are eluted and the dispersions, solutions or granulates obtained in this manner are mixed with graphite or carbon black for further processing. The electrodes situated at either side of the electrical layer resistance are covered with insulating materials if required, to prevent contact with conductive parts. The phenomenon, which is also utilised by the inventor in the present application, was described in Austrian patent specifications Nos. 325 176, 274 965 and 313 588 amongst others. Such planar heating elements proved satisfactory in practice under application of different resistive compositions.

OBJECTS AND SUMMARY OF THE INVENTION

The present invention has as its fundamental object to devise a heating element in which the heating performance can be determined in a simple and precise manner and which it is possible to integrate in different structural units.

This problem of the invention is resolved in that the layer is formed to be thermally insulating and is permeated by an electrically conductive synthetic resin material, in particular one having a positive temperature coefficient of electrical resistance and that the electrodes allocated to the two surfaces are connected conductively to each other, essentially via the conductive material. The unexpected advantages of this solution consist in that the heating performance may be adapted in an uncomplicated manner to different conditions of application by utilising a thermally insulating layer as an electrically resistive layer. Furthermore, this solution provides the possibility of establishing a direct connection between the insulation required in such heating systems and the heating element, so that a multilayer structure, for example such as had been required in the case of known heating foils, is eliminated. Another advantage of this surprisingly uncomplicated solution consists in that the commonly very sensitive resistive layers are protected against mechanical damage by incorporation into the thermally insulating layer and that breakdowns are averted in the case of heating systems comprising heating elements of this nature. The inherent thermal inhibition secured by means of the heating elements constructed in accordance with the invention is advantageous, e.g. in the case of heatable insulating jackets for pipes and the like, which increase the efficiency of such heating elements.

It is possible furthermore, within the scope of the invention, for the conductive synthetic resin material to be formed substantially denuded of solvents, in the manner of a thermoplast having a macro-molecular structure, and preferably from an acrylate comprising at least partially reticulated polymers with a small proportion of plasticiser, which has properties of semiconductors as well as a comparatively low proportion of carbon, the carbon components being present in freely suspended manner in the synthetic resin material. It is advantageous in the case of synthetic resin materials of this kind, that they possess a high degree of elasticity and adhesivity. Consequently, the thermally insulating layer remains ready for application for this reason, without alteration despite the constantly varying internal stresses during heating and cooling, as well as under mechanical stresses.

According to another and very important feature of the invention, provision is made for the thermally insulating material to comprise filler materials held together by means of a bonding agent incorporating the electrically conductive synthetic resin material. Thanks to the multiple function of the electrically conductive synthetic resin material, or rather to the fact that the latter may be utilised for the thermally insulating layer together with the bonding agent or as a substitute for the same, it is possible to produce the heating elements economically. Furthermore, the conductive synthetic resin material forms a skeleton conductor or a grid between the filler materials in this embodiment of the heating element.

In accordance with another embodiment of the invention, it is specified that the filler material is in granular and/or spheroidal form and preferably consists of miniature bubbles, whereby it is possible to obtain satisfactory thermic heat damping properties as well as a high mechanical loading capacity of the heating element with appropriate selection of the filler material.

Within the scope of the invention, it is also possible for the filler materials to be formed by granular and/or spheroidal insulating materials, for example pre-expanded polystyrene or the like, which form the carrier element together with the electrically conductive synmthetic resin material as the bonding agent, the thermally insulating layer thereby advantageously being utilised for generating heat and at the same time also serving the purpose of heat insulating or accumulation. The heat radiation of the heated areas or spaces is thereby simultaneously reduced in an advantageous manner. The quantity of the conductive synthetic resin material required may be predetermined by appropriate selection of the volume of the filler materials in question for different thickness of the heating element, and thereby determining its heating performance.

According to another advantageous embodiment of the invention, the filler materials, e.g. spheroids or miniature bubbles of synthetic resin material or ceramics composition, e.g. glass, are embedded in the conductive synthetic resin material and are preferably sintered together as well as with the electrodes, if appropriate. The quantity of electrically conductive synthetic resin material acting as the resistive composition, may be predetermined more precisely across the thickness of the layer by coating the surfaces of the filler materials, so that after the filler materials have been sintered together into a heating element, a pervasive contact is obtained for approximately identical planar resistance values. This simplifies the production of heating elements having an approximately identical heating performance, so that these are now useful for assembling larger heating surfaces.

It is advantageous if the thermally insulating layer is constructed as a plate-like carrier element, in particular as a heat barrier plate. In the case of this solution, the unexpected advantage consists in that the insulating material of the heat barrier plate also simultaneously forms the resistive composition apart from its function as a carrier element. The supporting components or facing panels or the like may thus have a direct application as heating elements. This solution also renders it possible to retain a desired resistive value with optimum precision during a large-scale production and to adapt the same to different required thicknesses or sizes of panels.

In accordance with the invention it is possible for the thermally insulating layer to be integrally connected to the electrodes and situated within a heat barrier plate of electrically insulating material. An economical production of the heating elements is possible thanks to the integral connection between the thermally insulating layer and the electrodes, since it is possible to omit an additional operation to establish contact between the electrodes and the thermally insulating layer. Furthermore, a higher load may be applied to the heating element thanks to its multilaminar construction in a sandwich structure. Another advantage consists in the satisfactory electrical connection between the electrically conductive synthetic resin material, i.e. the resistive composition, and the electrodes. If a black coating is complementarily situated on the side of the foils acting as electrodes facing towards the thermally insulating layer, which forms a black body, the result is an accumulation or a total adsorption of the thermal radiation in this black layer, and if the foil forming the electrode consists of metal, the result is an intensive reflection of energy, in particular of infrared thermal radiation.

Provision is made according to another embodiment of the invention for the electrodes to be formed by foils of metal and/or conductive synthetic resin materials and to be integrally connected to the electrically insulating layer via the electrically conductive synthetic resin material, a black coating being arranged as a black body if desired between the thermally insulating layer and the foil. If the foils are first coated with the conductive synthetic resin material, a defined layer of electrically conductive synthetic resin material is assured between the filler materials closest to the electrodes and the foils as a consequence of the spontaneous heat generation of the heating element, during a combined sintering operation. An approximately constant contact resistance is obtained thereby between the thermally insulating layer and the electrodes. Moreover, a more satisfactory contact heat and above all a more satisfactory heat absorption are accomplished thereby than, for example, upon utilising a pure aluminium foil as an electrode.

It is also possible, within the scope of the invention, for the electrodes to be formed by foils coated with a conductive synthetic resin material acting as a black body, between which the coated filler material is installed as a thermally insulating layer. The insulations required for heating elements operated on high voltage may simultaneously be utilised for heat accumulation or reduction of the outward radiation of the heat generated by the heating elements. In this connection, it is advantageous if the barrier layer of the barrier plate placed in the direction of outgoing radiation has a smaller thickness or a lower insulation factor than the insulating layer situated at the other side of the carrier element from the direction of outgoing radiation.

It is moreover possible for the resistane of the electrically conductive synthetic resin material to increase in the direction of outgoing radiation towards the object which is to be heated, and for preferably several thermally insulating layers having different electrical resistance values to form a carrier element. It is thereby accomplished that the heat output is intensified in the direction of outgoing radiation and is not inhibited in an undesirable manner by the filler materials, in particular if these are heat barrier materials.

A method for the production of a heating element is also within the scope of the invention. This method is characterised in that a fluid conductive synthetic resin material is mixed with particulate i.e. granular and/or spheroidal, filler materials and that the mixture of synthetic resin material and filler materials is placed in a mould between two conductive foils, whereupon the two halves of the mould are pressed gainst each other and the synthetic resin material is cured. Thanks to these uncomplicated process stages, namely the addition of a fluid conductive synthetic resin material having a positive temperature coefficient of electrical resistance, a heating element is produced simultaneously with the operation required for the production of heat barrier plates.

Provision is made according to another advantageous embodiment of the method, for the filler materials and preferably the facing sides of the electrodes formed by conductive foils to be coated with a conductive thermoplastic synthetic resin material, in particular having a positive temperature coefficient of electrical resistance whereupon the synthetic resin material is cured, after which the coated filler materials are placed between the two foils facing towards each other with their coatings and the foils are pressed together, the two foils simultaneously being connected to a source of voltage which is suitably a multiple of the intended operating voltage, whereupon the heating element is heated beyond the melting point of the thermoplatic synthetic resin mateial and the filler materials are sintered to each other and to the foils. The advantages of this solution consist in that the electrically conductive synthetic resin mateial is present in an approximately identical proportion throughout the thickness of the layer, and that a contraction of the filler materials for example within a liquid casting composition, is prevented thereby. Furthermore, an approximately constant prespecified quantity of electrical resistance is established by the coating operation in the areas of contact between the particulate filler materials, so that the required final temperature may be maintained in an uncomplicated manner.

BRIEF DESCRIPTION OF THE DRAWINGS

The invention will now be described, by way of example, with reference to the accompanying partly diagrammatic drawings, in which.

DETAILED DESCRIPTION OF PREFERRED EMBODIMENTS

Figure 1:
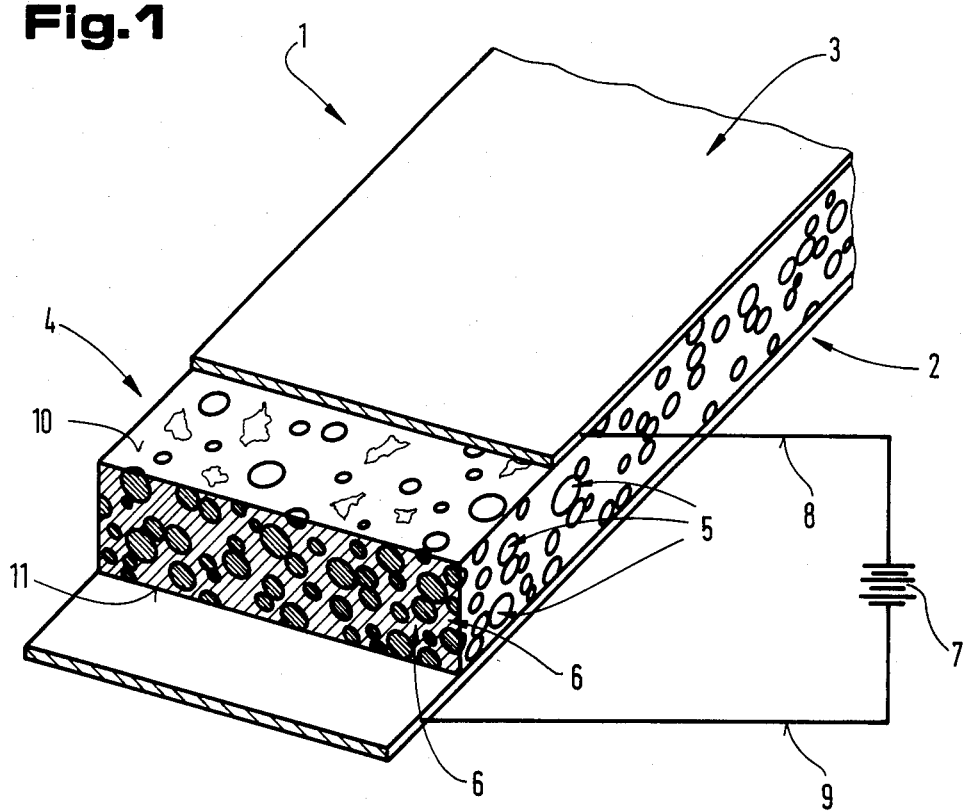
FIG. 1 is a perspective view, partly in section, of a heating element according to the invention.

A heating element 1 according to one embodiment of the invention is illustrated in FIG. 1. Electrical resistance layer 4 is situated between two planar electrodes 2 and 3. In accordance with the invention, this layer 4 is of thermal insulating nature, granular filler materials 5 being incorporated. A particularly satisfactory result is obtained if these granular filler materials are formed by insulating materials, for example pre-expanded polystyrene or the like. The layer 4 comprises a matrix of an electrically conductive synthetic resin material 6. This synthetic resin material 6 advantageously has a positive temperature coefficient of electrical resistance.

The two electrodes 2,3 connected to a voltage source 7 via conductors 8,9 and associated with surfaces 10,11 of the layer 4 form a closed circuit via the conductive synthetic resin material 6. The spatial synthetic resin material lattice formed by the conductive synthetic resin material 6 between the filler materials 5 forms a heating resistance which heats up during passage of current. The heating element may consequently be co-opted at the same time for insulation against outgoing thermal radiation of an object to be heated. Furthermore, the electrical resistance layer is protected against mechanical damage by incorporation within the thermally insulating layer. This averts failures in heating plants comprising heating elements of this nature, and the efficiency of heating elements 1 is increased by the inherent thermal barrier effect secured.

Figure 2:
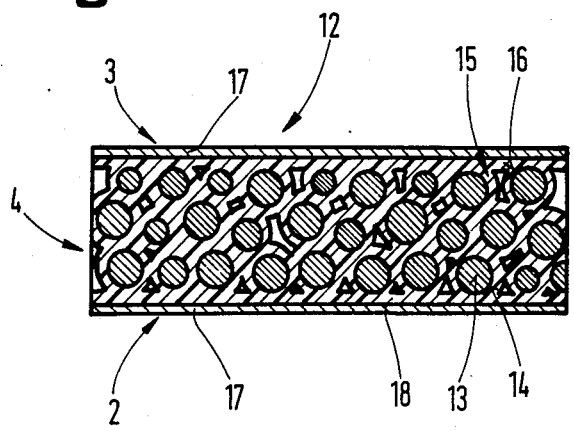
FIG. 2 is a sectional view of another embodiment of a heating element according to the invention, in which the filler materials are coated with the conductive plastics material.

A heating element 12, in which the filler materials are formed by spheroids 13, for example consisting of material commercially available under the name of "Styropor", is shown in FIG. 2. These spheroids 13 have a coating 14 which is formed by a bonding agent which has mixed into it a conductive plastics material. When these coated spheroids are placed between electrodes 2, 3 and pressed together while heated, the coatings of the spheroids will flow together to form a conductive matrix or skeleton 15 with interspersed filler spheroids 13 and some voids 16. It is advantageous in this connection if the synthetic resin material synthetic resin is substantially free of ions and is a thermosetting plastics material having a macromolecular structure. An acrylate comprising at least partially reticulated polymers and a small proportion of plasticiser, which has semiconductor properties and contains a comparatively small proportion of carbon, may preferably by utilised for this purpose, in which connection the carbon components should be arranged freely suspended to an optimum degree within the synthetic resin material.

A coating 18 is applied on the surfaces facing towards the layer 4 of the electrodes 2 and 3 formed by foils 17, e.g. of metal or conductive synthetic resin material. This coating 18 may comprise a bonding agent mixed with conductive synthetic resin material or merely a conductive synthetic resin material 16. In this connection, it is advantageous for the materials utilised for the coating 18 to be of deep black hue, so that this coating 18 simultaneously acts as a black body.

Figure 3:
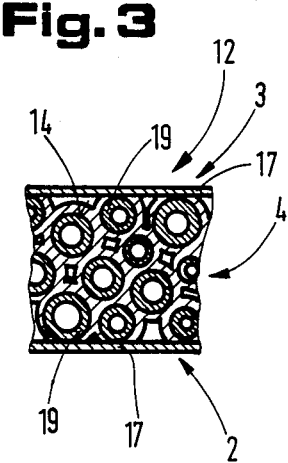
FIG. 3 is a like fragmentary view of a further embodiment of a heating element according to the invention, in which the filler materials are formed by miniature bubbles.

In FIG. 3 is shown a modified embodiment of a heating element 12, in which the filler materials comprise miniature bubbles 19. In this instance too, the miniature bubbles have a coating 14 which simultaneously acts as a bonding agent and as an electrical resistance element. As apparent moreover from the illustration, the separate filler materials or miniature bubbles 19 are bonded to each other and to the two foils 17 forming the electrodes 2,3. This fusion of the filler materials is performed by means of a compressive action on the foils 17 forming the electrodes 2,3 under simultaneous heating of the heating element 12. The voltage source 7, FIG. 1, may be co-opted for this heating operation. The voltage supplied by the voltage source 7 should for this purpose amount to a multiple of the normal operating voltage so that the temperature of the heating element is raised above the melting point of the coating 14 thereby to obtain the bonding together. In accordance with the invention, the heating elements may be adapted to be operated by means of low voltage, e.g. 12, 24 or 42 volts, or else by means of high voltage, e.g. 220 volts. During the fusing action, corresponding sintering voltages may for example amount to 36, 72, 126 or 660 volts respectively.

The separate filler materials or miniature bubbles 19 are reticulated into a compact layer 4 by the fusing action.

A comparison with the heating element 12 according to FIG. 2, which may be produced according to the same method, shows that if the coating 18 is omitted on the foil 17, the coating 14 of the miniature bubbles is reduced in thickness in the area of the foils 17 in the embodiment according to FIG. 3. By contrast, the current infeed in the embodiment according to FIG. 2 occurs in an approximately uniform manner throughout the surface of the foils, because of the coating 18.

Figure 4:
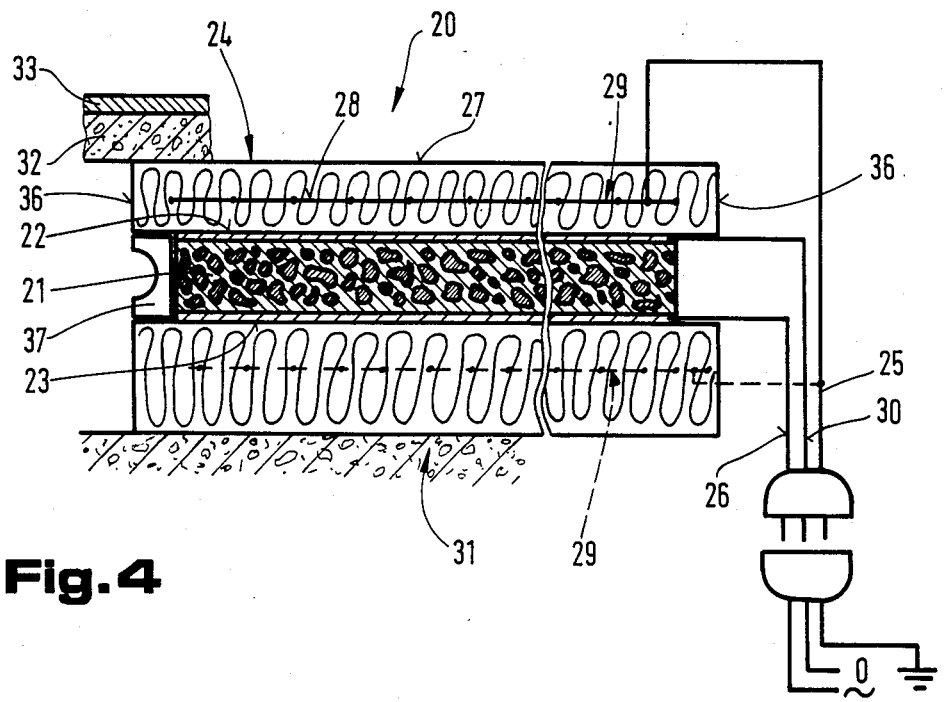
FIG. 4 is a sectional elevation of a heating element according to the invention and which is situated within a heat barrier plate of electrically insulating material.

Another embodiment of a heating element 20 is shown in FIG. 4, in which the insulating layer 21 is integrally joined to the electrodes 22,23. The insulating resistive layer 21, together with the electrodes 22,23, is situated within a heat barrier plate 24 extending above and below the heating element 20. The two electrodes 22,23 are respectively connected via conductors 25,26 to the neutral wire and to a phase of an a.c. supply grid. A protective electrode 29, for example formed by a conductive grid, a network 28 or a foil, is additionally situated between the electrode 22 and an upper side 27 of the heat barrier plate 24. The said protective electrode is connected to ground via conductor 30. In this case, the heat barrier plate below the electrode 23 has a greater thickness than the upper heat barrier plate between the electrode 22 and the surface 27. This provides a more effective heat barrier against radiation losses of the heating element downwardly in the direction of the surface situated at the other side from the surface 27.

Heating element 20 is preferably installed in a manner such that the surface of the heat barrier plate 24 at the other side from the surface 27 rests on a floor structure, e.g. on a coarse concrete flooring 31. The surface 27 is thereby associated with a superjacently positioned plaster floor 32 and a floor covering 33 situated above the latter. This system provides a protection against live parts, in particular against the electrode 23 connected to the phase, since for example if a metal component is inadvertently hammered into the heat barrier plate, a conductive connection between the protective electrode 29 and the electrode 22 connected to the natural wire, causes operation of a protective contact breaker mandatorily prescribed in the case of systems of this nature, e.g. of a fault or leakage current switch, by virtue of the connection of the neutral wire to the ground wire. The current supply is reliably interrupted as a result, before the intrusive metal part reaches the phase-carrying electrode 23. It is also possible, as denoted by broken lines in FIG. 4, to install a protective electrode 29 between the electrode 23 and the surface facing towards the upper side 27 and allocated to the unfinished concrete flooring 31. Apart from the resulting advantage that the phase-carrying electrode 23 also has a contact protection regarding the surface facing towards the upper side 27, it is accomplished by incorporating electrodes placed at a distance from the phase-carrying electrode 23, for example such as the electrode 22 connected to the neutral wire, or the protective electrodes 29, that the field is established in each case between the electrodes 23 and 22 and 23 and, 29 respectively, and that no interference fields are generated by the heating elements which may lead to unpleasant disturbances or interference for example in living accommodation.

Figure 5:
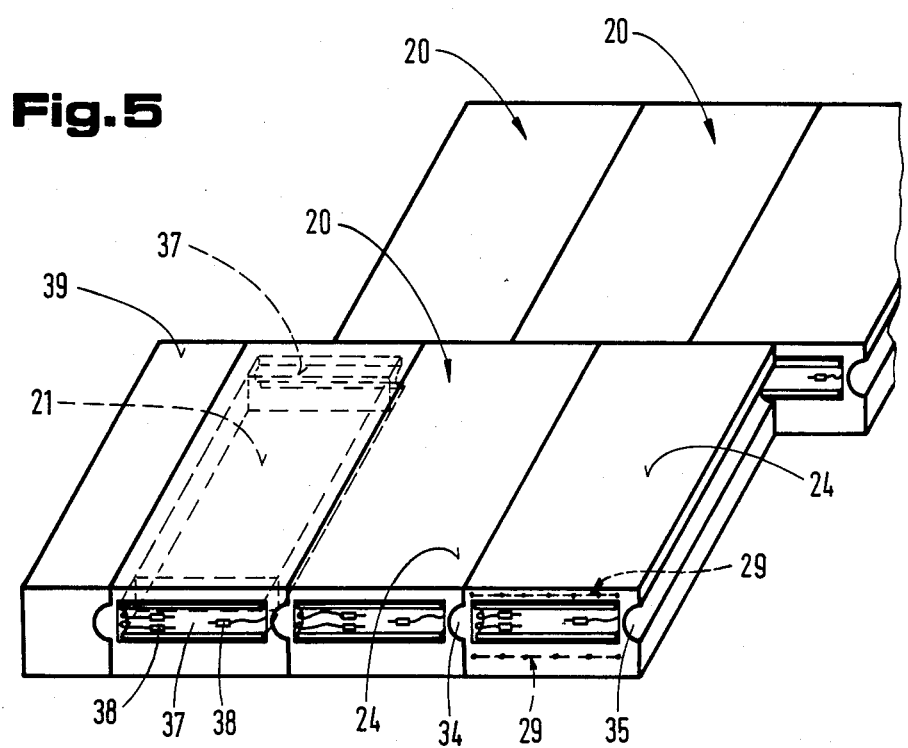
FIG. 5 is a perspective view of a heating installation assembled from heating elements according to the invention, for a floor heating system.

A heating area assembled from heating elements 20 of this kind is shown in FIG. 5. In the area of a longitudinal side edge, the heat barrier plates 24 are equipped with a tongue 34 and in the area of the oppositely situated longitudinal side edge with a groove 35, for the purpose of forming an uninterrupted insulating covering having an approximately plane surface. Contact is established with the electrodes 22,23 as well as with the possibly incorporated protective electrodes 29 in the extreme end portions of the heating elements 20. To this end, the end sides of the insulating layer 21 or of the electrodes 22,23, respectively, are set back as shown in FIG. 4, with respect to the extreme edges 36 of the heat barrier plate 24. As apparent from the left-hand half of FIG. 4, the cavity formed thereby may be closed off by means of a cover 37 which in the direction of the terminal or extreme edge 36 of the heat barrier plate 24 has a depression or recess wherein are installed connecting wires with plugs and sockets, respectively, of a coupling device 40, as more clearly apparent from FIG. 5, for interconnection of the electrodes of mutually parallel rows of heating elements 20.

So that it may be possible to connect the heating areas in corner sections by means of trimming plate portions in an uncomplicated manner, dummy elements 39 may be associated with the heating elements 20.

Thanks to the structure of the heating element 20, the heat emission in the direction of outgoing radiation, i.e. in the direction of the upper side 27, is intensified thanks to the different thickness of the heat barrier plate above and below the insulating layer 21 as well as to the utilisation of an electrically conductive synthetic resin material having a positive temperature coefficient of the electrical resistance. In view of positioning the heating elements 20 on the rough concrete floor 31 and the outgoing radiation losses implied thereby, the part of the insulating layer 21 facing forwards the upper side 27 is heated more intensively. This higher degree of heating simultaneously also causes the electrical resistance to increase, an even greater heat transfer being accomplished thereby. A greater heat transfer will consequently occur in the areas of the insulating layer facing towards the upper side 27 than in the areas facing towards the rough concrete floor 31. The heat transfer in the direction of the object which is to be heated is consequently increased.

Figure 6:
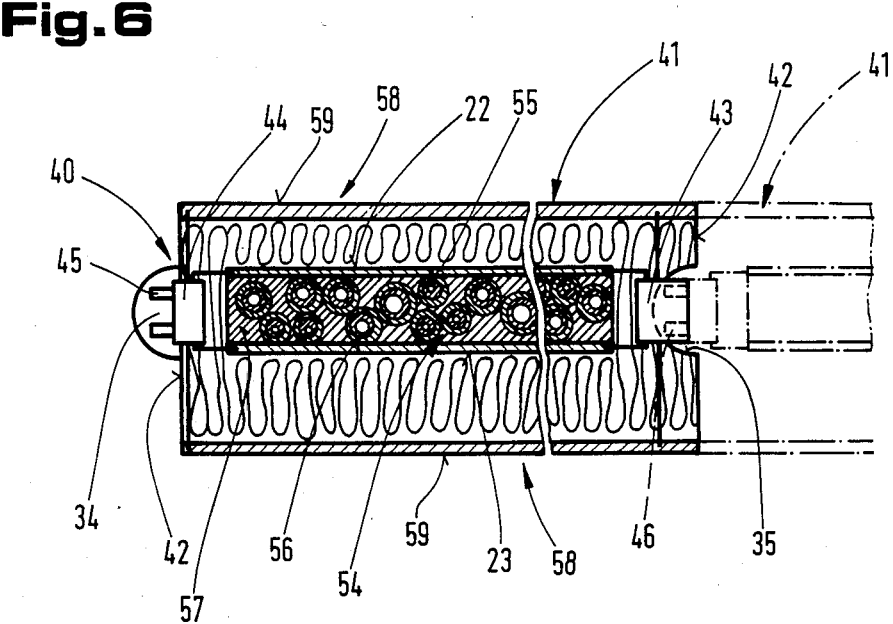
FIG. 6 is a sectional elevation of another embodiment of a heating element with a connector device.

Another modified embodiment for a coupling device 40 for joining together two adjacently situated heating elements 41 is shown in FIG. 6. These heating elements 41 also have a groove 35 and a tongue 34, respectively, in the area of end sides 42. A plug-in socket 43 is situated in the area of the groove 35, whereas a plug 44 of the coupling device is situated in the area of the tongue 34 of the oppositely situated end side 42. Upon pushing together the heating elements 41 and interengaging the grooves 35 and tongues 34 of mutually abutting heating elements 41, the connector pins 45 of the plug 44 are simultaneously inserted into sleeves 46 of the plug-in socket 43, and the electrodes 22,23 of the directly contiguous heating elements are thus connected electrically. In case of incorporating additional protective electrodes 29, it is obviously also possible to connect the protective electrodes of the mutually abutting heating elements 41 by incorporating a third connector pin and third bushing respectively, in the connecting or coupling device 40.

Figure 7:
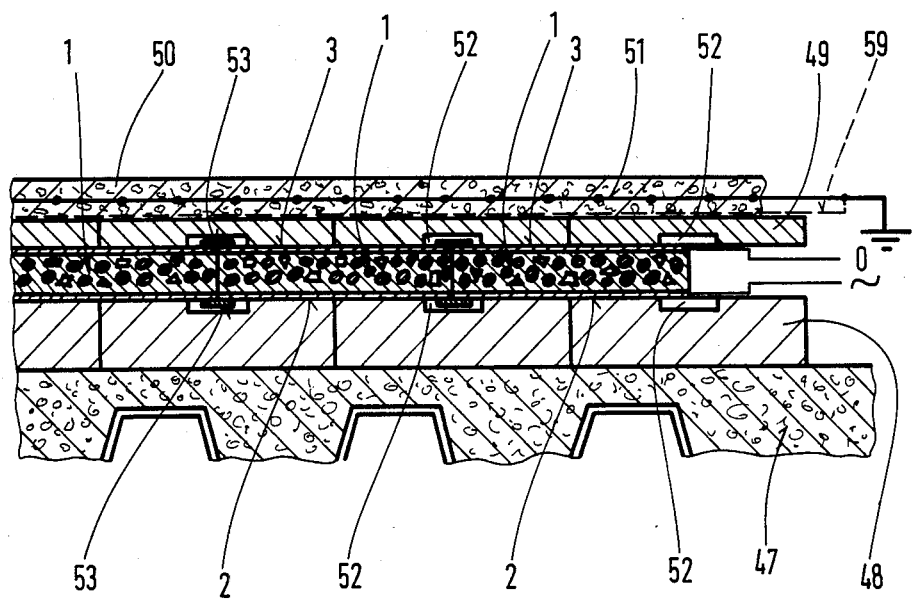
FIG. 7 is a fragmentary sectional elevation of a heating installation assembled from heating elements in accordance with the invention.

The laying of heating elements 1 and their electrical connections upon forming a larger heating surface are shown in FIG. 7. To install a floor heating system, heat barrier plates 48 are laid on a floor structure 47. The heating elements 1 are laid on these heat barrier plates 48. The heating elements 1 are covered by means of plates 49 which are electrically and if appropriate also thermally insulating. A plaster floor 50 which has a floor grid 51, or an electroconductive foil as shown in broken lines, arranged in it, is laid on these plates 49. The electrodes 2,3 as well as the floor grid 51 or electrically conductive foil acting as a protective electrode placed between the plaster floor and the plates 49, are connected to the neutral wire, the phase and ground, respectively.

Recesses 52 are preferably arranged in the heat barrier plates 48 and plates 49, respectively, for conductive connection of the individual electrodes 2,3 of the mutually abutting heating elements 1. A conductive connection between the electrodes 2 and 3 of the mutually abutting heating elements 1 is established in their area via contact pieces 53.

As apparent from the illustration in FIG. 7, the plate thickness of the heat barrier plates 48 is greater than that of the plates 49. The propagation of heat from the heating elements 1 in the direction of the space to be heated is not impeded therefore by the plates 49, if these are thermally insulating, an outgoing heat radiation in the other direction being obstructed by the thicker heat barrier plates 48.

Instead of the plates 49, it is also possible to lay a levelling layer, for example of sand, skim coat or the like, or merely to install an insulating foil above the electrode 3, on which the plaster floor 50 may then be applied direct. A corresponding insulating covering foil—denoted by broken lines—may in a similar manner be situated above the electrode 3 instead of the plates 49, on which a floor covering, for example adhesive parquet flooring or the like, may also be installed direct.

It is also possible within the scope of the invention that the thermally insulating layer 54 may be reinforced to assume an increased carrying capacity. This reinforcement is of importance primarily if the surface of the miniature bubbles 55 utilised within the insulating layer 54 is inadequate to bear the specified stresses upon loading the thermally insulating layer, for example the flexural and breaking strains. In this case, the miniature bubbles may have a surface coating 56, as illustrated. This surface coating may merely result in superficial upgrading, that is an increase in surface strength, silicate coatings being utilised for this purpose in an advantageous manner. It is possible however merely to seal the surface by means of this surface coating 56, if appropriate complementarily to the surface upgrading action, i.e. to reduce the absorptive capacity of the miniature bubbles 55, so that when an electrically conductive synthetic resin material 57 is then cast around these, as in the present embodiment, the miniature bubbles absorb less electrically conductive synthetic resin material, or none.

The miniature bubbles 55 are advantageously produced from thermoplastic materials. When the heating element is exposed to heating for bonding the miniature bubbles or to cure the insulating layer, this causes an irreversible permanent plastic deformation of these miniature bubbles, so that a resiliency of the insulating layer and a reversion to the original condition are averted.

It is possible moreover, as shown in FIG. 6, for the protective electrodes 58 to be formed by uninterrupted electrically conductive foils. If the foil consists of metal foil an advantageous reflection of the thermal radiation is obtained primarily from the section which is allocated to a rough concrete floor or the like. The foil facing towards the heated space is preferably formed as a black body so that an intensive heat transfer occurs between the heating elements 41 and the space which is to be heated. The uninterrupted foil has the additional advantage moreover that a specific field generation intervenes between the phase-carrying electrode and the protective electrode 58 in question or the uninterrupted foil 59 forming the latter, and that the build-up of interference fields is prevented thereby.

In accordance with the invention, it is possible furthermore in an advantageous manner to make use for the electrodes and in particular for the protective electrodes 29, in replacement of the said grid of meshwork, of a foil or fleece of conductive fibres within a barrier or protective element situated above the heating element. If a metal grid is utilised, this should have extremely small mesh widths or be produced in the manner of a fine sieve, to ensure that a conductive connection is established with any intrusive metal part which might be hammered in. It is only in such case that it is possible to assure a reliable actuation of the protective device and thus an interruption of the current supply in case of further penetration by the metal element and its impingement on the electrode.

It is to be understood that the filler materials illustrated in FIGS. 1 to 7, such as spheroids, miniature bubbles, as well as the conductive synthetic resin material, have been illustrated in greatly enlarged form, as compared to the actual practical embodiment, to facilitate a clearer description of the operation of the heating elements and a clearer grasp of the invention.

It is advantageous moreover if a conductive synthetic resin material such as that described in the Austrian Pat. No. 313 588 of the present inventor, is utilised as a conductive synthetic resin material. The advantages of this electrically conductive synthetic resin material consist in that apart from a positive coefficient of its electrical resistance, it provides a satisfactory protection against corrosion and that a long-term durability of the heating elements according to the invention is thus assured within a corrosive environment. Above all, care should be applied to make certain that the electrically conductive synthetic resin materials applied, which are utilised for the heating elements according to the invention or are utilised as filler materials or miniature bubbles, are free of solvents.

The heating elements 1, 12, 41 described in the foregoing, may be applied within the scope of the invention and in optional positions and embodiments for heating containers, volumes, vehicles or the like. They are utilisable to identical advantage as ceiling or wall heating elements. They are advantageously also appropriate for utilisation as pipe jacket means or insulation means for downpipes in the case of roof gutters or in conjunction with pipes which are to be protected against freezing.

Another substantial advantage of the invention consists in that the passage of current cannot occur along the shortest distance between the two electrodes spaced apart by the layer 4, but is deflected or diverted by the filler materials and has to by-pass these, whereby an optimum exploitation of the electrical heating power supplied is assured.

While the invention and many of its attendant advantages will be understood from the foregoing description, it will be apparent that various changes may be made in the form construction and arrangement of parts and method of construction without departing from the spirit or scope of the invention or sacrificing its advantages, the forms described hereinbefore being preferred embodiments thereof.

What is claimed is:

1. A heating element comprising a resistance layer forming an electrical resistance disposed between two planar electrodes extending generally parallel to each other and to the resistance layer in which flow of current between the electrodes occurs at right angles to a plane extending generally parallel to the resistance layer, the resistance layer comprising a matrix of an electrically conductive synthetic resin material having a positive temperature coefficient of electrical resistance and a particulate thermally and electrically insulating filler material dispersed throughout the synthetic resin material matrix, the electrodes being disposed at opposite surfaces of the resistance layer and being electrically interconnected through the conductive synthetic resin material matrix.

2. A heating element as claimed in claim 1, in which the conductive synthetic resin is substantially free of solvent and of macromolecular structure.

3. A heating element as claimed in claim 2, in which the conductive synthetic resin material is an acrylate comprising at least partially reticulated polymers with a small proportion of plasticizer, which has semiconductor properties and includes a small proportion of a carbon component freely suspended within the synthetic resin material.

4. A heating element as claimed in claim 1, wherein the matrix of the electrically conductive synthetic resin has a bonding agent incorporated therein for holding together the thermally insulating particulate filler material.

5. A heating element as claimed in claim 4, in which the particulate filler material has granular, spheroidal or miniature bubble form.

6. A heating element as claimed in claim 1, in which the particulate material is pre-expanded polystyrene and the electrically conductive synthetic resin material is a bonding agent.

7. A heating element as claimed in claim 1, wherein the synthetic resin material is a bonding agent, the particulate filler material is coated with the synthetic resin material and the synthetic resin material bonds the particulate filler material together and to the electrodes.

8. A heating element as claimed in claim 1, in which the electrically conductive and thermally insulating resistance layer is formed with a plate shaped carrier element providing at one side of the element an electrically insulating heat barrier plate.

9. A heating element as claimed in claim 1, in which the electrically conductive and thermally insulating resistance layer is integrally connected to the electrodes and is situated within a heater barrier plate of electrically and thermally insulating material extending on opposite sides of the element.

10. A heating element as claimed in claim 1, in which at least one of the electrodes comprises an electrically conductive foil integrally connected to the resistance layer by electrically conductive synthetic resin material comprising a black coating between the resistance layer and the foil.

11. A heating element as claimed in claim 1, in which the resistance of the electrically conductive synthetic resin material increases towards one side of the layer arranged to face in a radiant heating direction.

* * * * *